United States Patent [19]
Sato et al.

[11] Patent Number: 4,815,830
[45] Date of Patent: Mar. 28, 1989

[54] SMALL SIZED ZOOM LENS

[75] Inventors: Yasuhisa Sato, Kanagawa; Yasuyuki Yamada, Tokyo; Hiroki Nakayama, Kanagawa, all of Japan

[73] Assignee: Canon Kabushiki Kaisha, Tokyo, Japan

[21] Appl. No.: 643,820

[22] Filed: Aug. 23, 1984

[30] Foreign Application Priority Data

Aug. 26, 1983 [JP] Japan ................................. 58-156684

[51] Int. Cl.$^4$ ............................................. G02B 15/14
[52] U.S. Cl. ..................................... 350/427; 350/423
[58] Field of Search ............... 350/423, 426, 427, 469, 350/481

[56] References Cited
U.S. PATENT DOCUMENTS 3,614,207 10/1971 Basista ................................... 350/427
4,303,313 12/1981 Imai et al. ............................. 350/456
4,659,186 4/1987 Sato et al. ............................. 350/427

Primary Examiner—John K. Corbin
Assistant Examiner—P. M. Dzierzynski
Attorney, Agent, or Firm—Toren, McGeady & Associates

[57] ABSTRACT

A zoom lens including a first lens unit of positive power and a second lens unit of negative power with the axial separation therebetween varies to bring about zooming. The first lens unit includes at least one positive lens and at least one negative lens and the second lens unit consists of a forwardly concave negative meniscus lens, thereby making the lens system small.

14 Claims, 5 Drawing Sheets

F I G. 4(A)
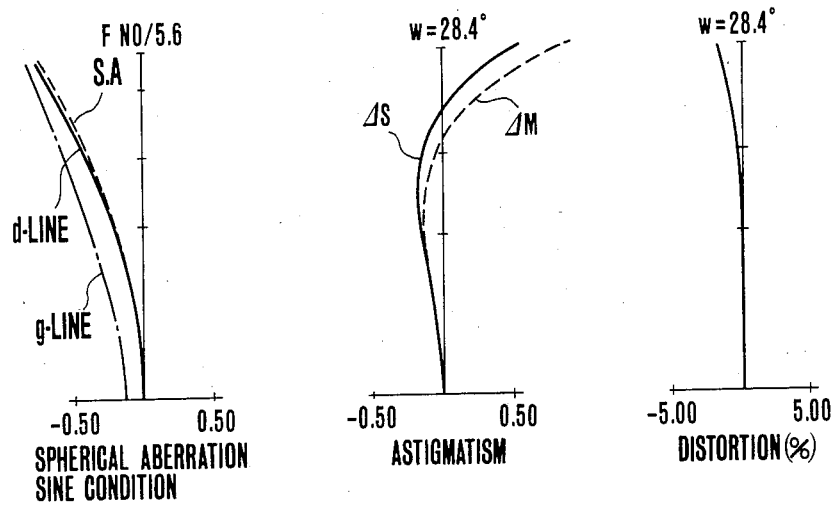
F I G. 4(B)
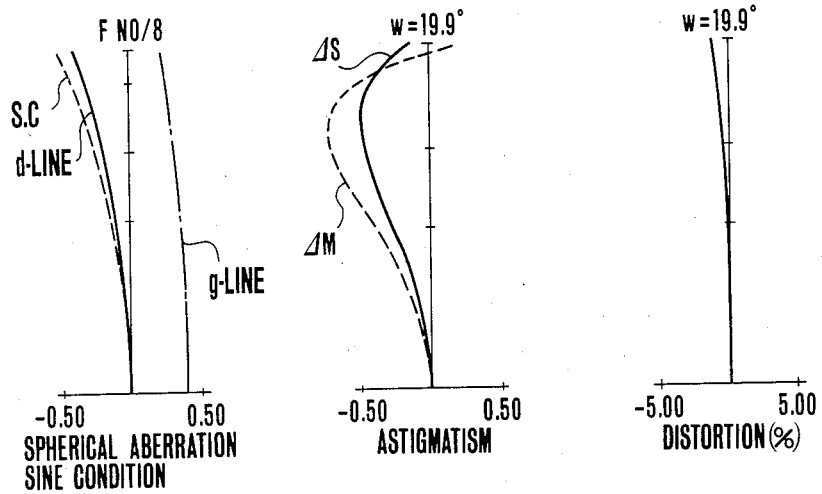

SMALL SIZED ZOOM LENS

CROSS-REFERENCE TO RELATED APPLICATIONS

U.S. patent application Ser. No. 709,445, filed Mar. 3, 1985, now U.S. Pat. No. 4,659,186, to Sato et al.

BACKGROUND OF THE INVENTION

1. Field of the Invention:

This invention relates to small sized zoom lenses and more particularly to small sized zoom lenses in a range from a semi-wide angle to a semi-telephoto suited for compact cameras such as lens shutter cameras.

2. Description of the Prior Art:

Following the recent trend in the art to reduce camera bulk and size, there has been an increasing demand for shortening the objective length in the longitudinal direction. And for camera having a lens shutter, which is not able to interchange its objective lens, a zoom lens is desired instead of the monofocal lens. In this case, the size of the zoom lens should not be unduly larger than that of the monofocal lens.

Many zoom lenses of a range including the standard field angle (letting 2ω denote the total angular field, the semi or standard field angle is 2ω=47° for the 35 mm still camera with 50 mm lens), the semi-wide angle and the semi-telephoto angle (hereinafter called "standard" zoom lenses) have, for example, been proposed in Japanese Patent Publication No. SHO 49-29146. The zoom lens of the kind described in this patent includes a front lens group of negative power and a rear lens group of positive power, the air space between the front and rear lens groups vary to bring about zooming. The use of such negative power followed by positive refractive power distribution, however, necessarily results in a long back-focal distance which, though suitable for single lens reflex cameras, is too large for a small size lens shutter camera.

To remove such a drawback, Japanese Laid-Open Patent Application No. SHO 57-201213 has proposed a zoom lens in which the front lens group is positive and the rear lens group is negative. With this power distribution, it is relatively easy to achieve a zoom lens system with a shortened back-focal distance as well as a shortened physical length, as will be described later. In the practical embodiment of the prior art, however, two lens elements of positive and negative powers are used to form the rear lens group of the zoom lens. For use in simple cameras, the number of lens elements is rather large. This makes it difficult to construct a compact zoom lens.

An object of the present invention is to provide a of reduced length zoom lens from the front vertex to the image plane.

A second object is to provide a zoom lens composed of a relatively small number of lens elements.

A third object is to provide a lens having a zooming range from the standard angular field to the wide angular field.

SUMMARY OF THE INVENTION

A small sized zoom lens includes a first lens unit of positive refractive power including at least one positive lens and at least one negative lens and a second lens unit of negative refractive power arranged on the image side of the first lens unit which consists of a negative meniscus lens concave toward the front end. Zooming is performed by varying the axial separation between the first lens unit and the second lens unit.

BRIEF DESCRIPTION OF THE DRAWINGS

FIGS. 4(A) and 4(B) are graphic representations of the aberrations of the wide angle and telephoto ends respectively in a second embodiment of the invention.

DESCRIPTION OF THE PREFERRED EMBODIMENTS

Figure 1:
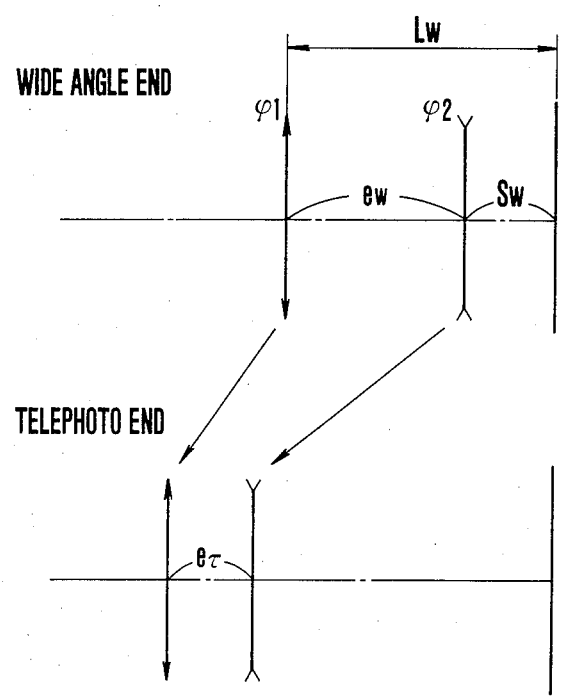
FIG. 1 is a schematic diagram of the power distribution in a predesigned zoom lens according to the present invention.

FIG. 1 schematically illustrates the refractive power distribution of an optical system of a zoom lens of the present invention. In the optical arrangement having the front component of positive power and the rear component of negative power, the total lens length (from the front vertex to the film plane) is shortest in the wide angle end and longest in the telephoto end. For good portability, it is advantageous to further shorten the total lens length in the wide angle end. Here, letting $L_W$ identify the total lens length in the wide angle end, and $S_W$ the back-focal distance in the wide angle end, the following relation holds:

$$\begin{aligned} L_W &= e_W + S_W \\ &= e_W + \frac{1 - e_W \phi_1}{\phi_W} \\ &= \frac{1}{\phi_W} + \left(1 - \frac{\phi_1}{\phi_W}\right) e_W \end{aligned} \quad (A)$$

Here, since $\phi_W$ has a constant value, for a larger value of $\phi_1$ and a smaller value of $e_W$, the total length of the lens $L_W$ can be shortened. Meanwhile, $\phi_1$ and $\phi_2$ are related to each other by the following formulas:

$$\phi_W = \phi_1 + \phi_2 - e_W \phi_1 \phi_2 \quad (B)$$

$$\phi_T = \phi_1 + \phi_2 - e_T \phi_1 \phi_2 \quad (C)$$

where $\phi_T$ is the refractive power of the entire system when zoomed in the telephoto end, and $e_T$ is the interval between the principal points of the front and rear components in the telephoto end.

Here, since the values of $\phi_W$, $\phi_T$ and $e_T$ are given (because the $e_T$ must have a short enough value so it will not admit mechanical interference between the front and rear components in the telephoto end), the formulas (B) and (C) represent a relation between $\phi_1$, $\phi_2$ and $e_W$. When $\phi_1$ is variable, therefore, equations of $\phi_2$ and $e_W$ can be obtained from the formulas (B) and (C), and the solutions can be easily determined.

Thus, the total length of the lens $L_W$ at the wide angle end can be shortened when the refractive power $\phi_1$ of the front component is a larger value, and the interval $e_W$ between the principal points of the front and rear components is a smaller value. Since, in this case, however, the refractive power $\phi 2$ of the rear component also gets a negative large value, the Petzval sum greatly increases negatively, leading to over-correction of the field curvature which is difficult to correct. Large comatic aberrations are also produced.

Figure 2:
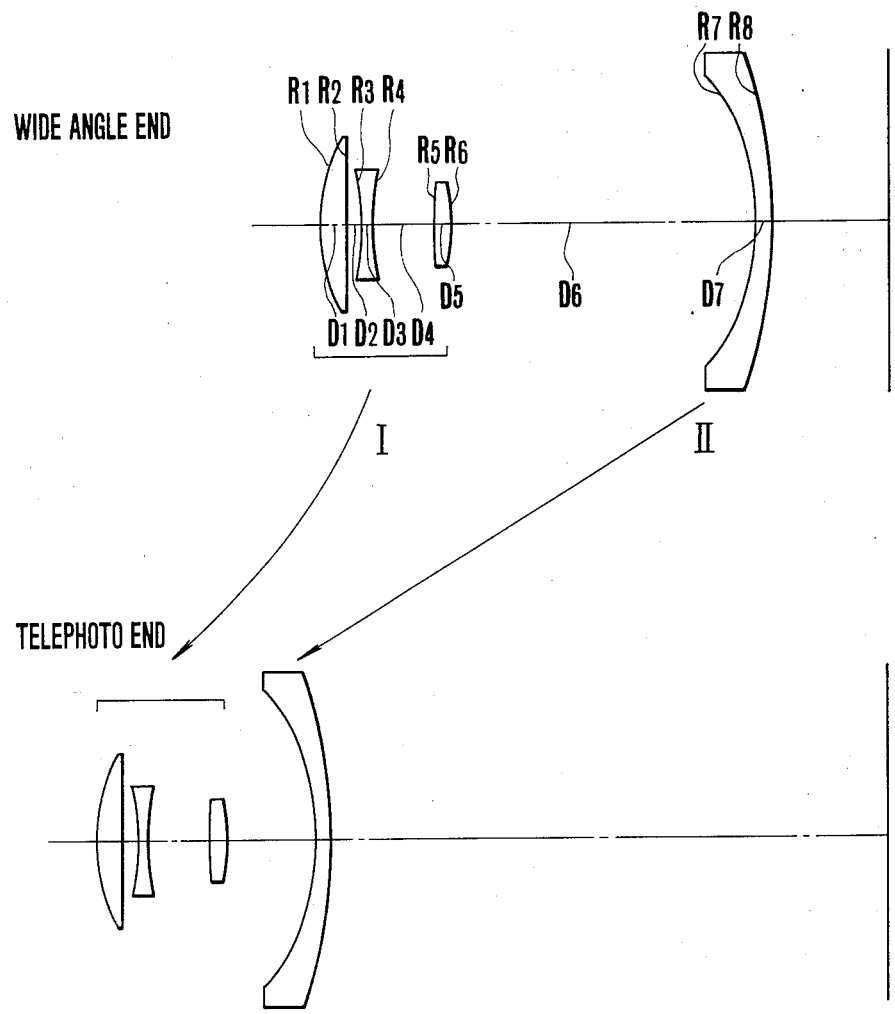
FIG. 2 is a longitudinal section view of a first embodiment of a specific zoom lens of the present invention.
Figure 3A:
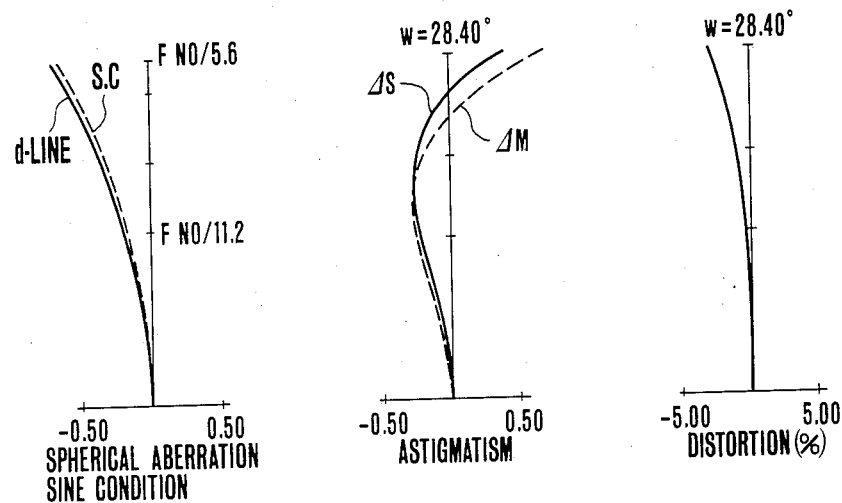
FIGS. 3(A) and 3(B) are graphic representations of the various aberrations of the lens of FIG. 2 respectively in the wide angle and telephoto ends.
Figure 3B:
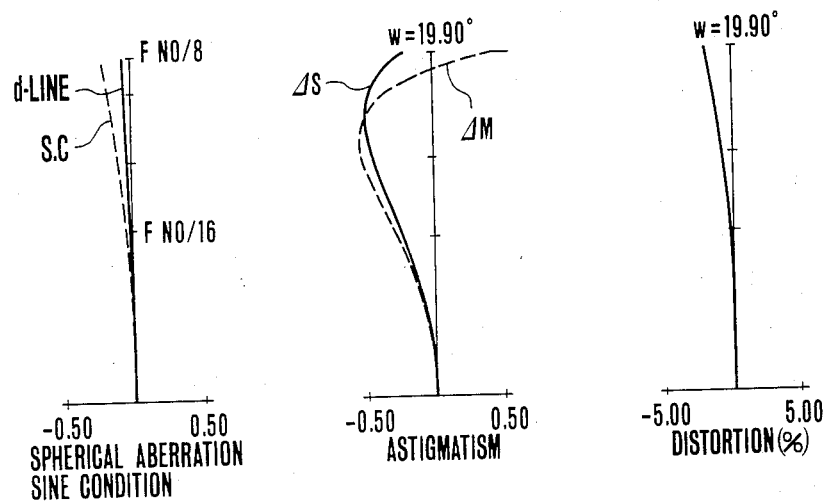
Figure 5A:
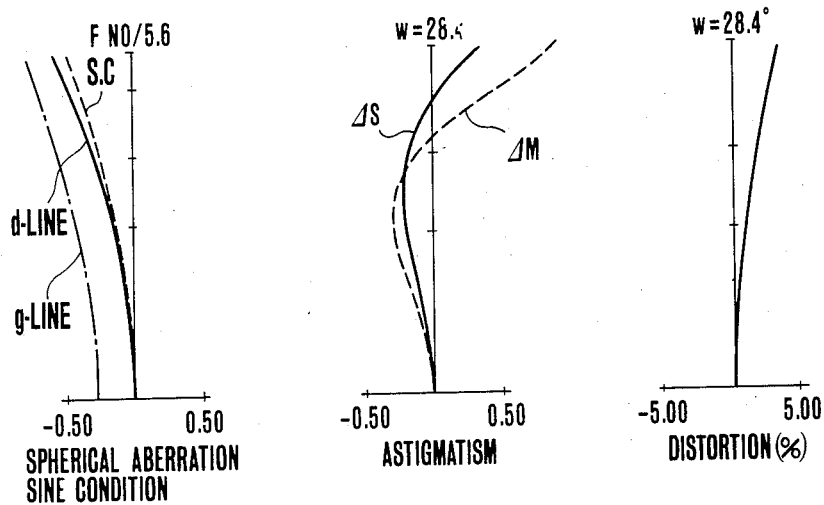
FIGS. 5(A) and 5(B) are graphic representations of the aberrations of the wide angle and telephoto ends respectively in a third embodiment of the invention.
Figure 5B:
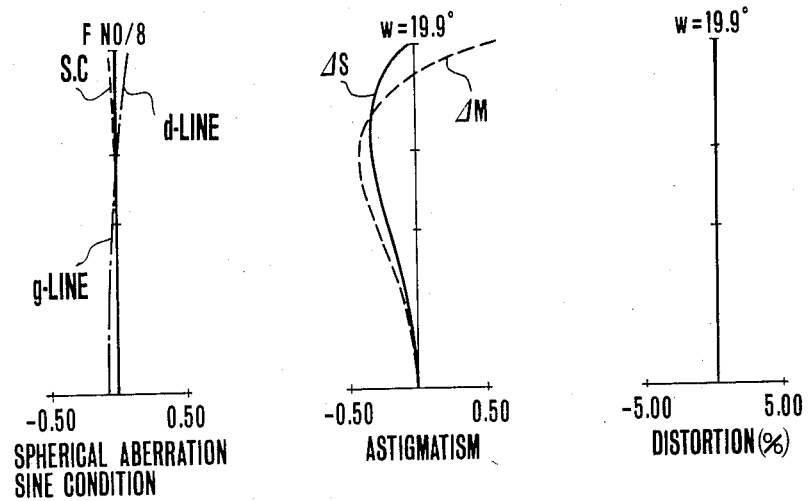

In an embodiment shown in FIG. 2, the zoom lens comprises, from front to rear, a first lens of positive power, a second lens of negative power and a third lens of positive power which, as a whole, constitute a front lens group of positive power, rearwardly followed by a rear component consisting of a meniscus shaped fourth lens of negative power which is concave toward the front. The axial separation between the front lens group and the rear component is varied with magnification power.

And, to accomplish the objects of the present invention with better results and to achieve good aberration correction, the following conditions are set forth:

(1) $\phi_W < \phi 1 < 1.5\phi_W$
(2) $-\phi_W < \phi 2 < -0.4\phi_W$
(3) $0.4/\phi_W < e_W < 1/\phi_W$ where $\phi 1$ is the refractive power of the front lens group; $\phi 2$ is the refractive power of the rear component, $\phi_W$ is the refractive power of the entire system in the wide angle end; and $e_W$ is the interval between the principal points of the front lens group and the rear component in the wide angle end.

Hence, the inequalities of conditions (1) to (3) shorten the total lens length while still preserving superior aberration correction.

Either when the refractive power $\phi 1$ of the front lens group exceeds the upper limit of the inequalities of condition (1), or when the refractive power $\phi 2$ of the rear component exceeds the lower limit of the inequalities of condition (2), though the total lens length shortens, as has been stated before, over-correction of field curvature results and coma also increases so that superior of aberration correction becomes difficult to achieve even when additional conditions to be described later are satisfied.

Conversely when either the lower limit of condition (1) or the upper limit of condition (2) is exceeded, the rear component comes very near the film plane.

The inequalities of condition (3) represent an appropriate range for the separation between the front lens group and the rear component in view of advancing the compactness of the zoom lens. When the upper limit is exceeded, the possibility of the rear component mechanically interfering with the film plane is increased when the lower limit is exceeded. The refractive powers $\phi 1$ and $\phi 2$ must be increased to obtain the prescribed zoom ratio. As a result, an over-corrected field curvature and large coma are produced and the aberration problem is difficult.

In the embodiment of the invention, the rear component is constructed with only one lens. While most of the prior known zoom lenses have a rear component consisting of two or three lenses, in the present invention under the following conditions, the use of one lens suffices for the construction of the rear component.

That is, for the Abbe number, $\nu 4$, of the glass of the fourth lens, and the radius of curvature R7 of the front lens surface, numerical limits are given as follows:

(4) $\nu 4 < 40$
(5) $-0.8/\phi_W < R7 < -0.3/\phi_W$

Note, even the highest of the Abbe numbers of the ordinary optical glass does not exceed 70. Fluorite and other special materials have Abbe numbers as high as 95.

The inequality of condition (4) is to decrease variation of the longitudinal chromatic aberration with zooming. When condition (4) is violated, chromatic aberration cannot be stabilized. The inequalities of condition (5) are to lessen the variation of the field curvature with zooming. When the upper limit is exceeded, in zooming from the wide angle end to the telephoto end, the field curvature varies in a direction to be under-corrected. When the lower limit is exceeded, it conversely varies until over-corrected. In any case, the image loses flatness, and the image quality objectionably deteriorates.

To achieve a further improvement in the correction of chromatic aberrations over the entire zooming range, satisfaction an additional or sixth condition (6) for the Abbe number $\nu 1$ of the glass of the first lens is preferred. Also, to facilitate minimization of the bulk and size of the zoom lens as a whole and preservation of the desired certain zoom ratio satisfaction of a seventh condition (7) is preferred.

That is, these conditions are defined as:

(6) $20 < \nu 1 < 40$
(7) $0.2/\phi_W < e_W - e_T < 0.8/\phi_W$

When the upper limit of the inequalities of condition (6) is exceeded, the longitudinal chromatic aberration varies in a direction to be further over-corrected as zooming from the wide angle end to the telephoto end. When the lower limit is exceeded, the longitudinal chromatic aberration varies in the opposite direction to be further under-corrected. In any case, the range of variation of the chromatic aberration is large and the image quality is badly deteriorated.

When the upper limit of the inequalities of condition (7) is exceeded, the total length of lens must be increased to insure the prescribed value of zoom ratio. When the lower limit is exceeded, the refractive powers $\phi 1$ and $\phi 2$ must be strengthened. Otherwise, the prescribed value of zoom ratio cannot be insured. Good correction of aberrations becomes difficlt to perform.

Numerical specific examples of the zoom lens of the invention are shown in the following tables for the radii of curvature, R, the axial thicknesses and air separations, D, and the refractive indices, N, and the Abbe numbers $\nu$, of the glasses of the lens elements with the subscripts numbered consecutively from front to rear.

EXAMPLE 1

| $F = 40\sim60$ | $FNO = 1:5.6$ | $2\omega = 56.8°\sim39.7°$ | |
|---|---|---|---|
| R1 = 18.64 | D1 = 2.18 | N1 = 1.78472 | $\nu 1 = 25.7$ |
| R2 = 235.87 | D2 = 1.34 | | |
| R3 = −29.30 | D3 = 1.00 | N2 = 1.84666 | $\nu 2 = 23.9$ |
| R4 = 22.88 | D4 = 5.43 | | |
| R5 = 59.67 | D5 = 1.65 | N3 = 1.69680 | $\nu 3 = 55.5$ |
| R6 = −19.04 | D6 = Variable | | |
| R7 = −21.71 | D7 = 1.34 | N4 = 1.60311 | $\nu 4 = 60.7$ |
| R8 = −47.86 | | | |

| | f = 40 | f = 60 |
|---|---|---|
| D6 | 27.50 | 7.90 |
| $\phi 1 = 1.14\phi_W$ | $\theta_W = 0.665/\phi_W$ | |
| $\phi 2 = -0.595\phi_W$ | $\theta_W - \theta_T = 0.49/\phi_W$ | |
| | $R_7 = -0.543/\phi_W$ | |

EXAMPLE 2

| F = 40~60 | FNO = 1:5.6~8 | 2ω = 56.8°~39.7° | |
|---|---|---|---|
| R1 = 16.09 | D1 = 3.50 | N1 = 1.69895 | ν1 = 30.1 |
| R2 = 142.85 | D2 = 0.95 | | |
| R3 = −31.27 | D3 = 1.00 | N2 = 1.80518 | ν2 = 25.4 |
| R4 = 19.74 | D4 = 4.72 | | |
| R5 = 38.10 | D5 = 3.51 | N3 = 1.69100 | ν3 = 54.8 |
| R6 = −20.17 | D6 = Variable | | |
| R7 = −18.94 | D7 = 1.50 | N4 = 1.77250 | ν4 = 49.6 |
| R8 = −41.62 | | | |

| | f = 40 | f = 60 |
|---|---|---|
| D6 | 22.05 | 8.69 |

$\phi 1 = 1.25\phi_W$ $\quad\quad \theta_W = 0.568/\phi_W$
$\phi 2 = -0.863\phi_W$ $\quad\quad \theta_W - \theta_T = 0.309/\phi_W$
$\quad\quad\quad\quad\quad\quad\quad\quad R7 = -0.474/\phi_W$

EXAMPLE 3

| F = 40~60 | FNO = 1:5.6~8 | 2ω = 56.8°~39.7° | |
|---|---|---|---|
| R1 = 24.24 | D1 = 2.53 | N1 = 1.81000 | ν1 = 35.3 |
| R2 = −1846.17 | D2 = 2.62 | | |
| R3 = −23.61 | D3 = 1.00 | N2 = 1.80518 | ν2 = 25.4 |
| R4 = 34.29 | D4 = 3.34 | | |
| R5 = −2302.90 | D5 = 3.30 | N3 = 1.83481 | ν3 = 42.7 |
| R6 = −18.53 | D6 = Variable | | |
| R7 = −22.08 | D7 = 1.68 | N4 = 1.51633 | ν4 = 64.1 |
| R8 = −45.84 | | | |

| | f = 40 | f = 60 |
|---|---|---|
| D6 | 32.73 | 5.96 |

$\phi 1 = 1.052\phi_W$ $\quad\quad \theta_W = 0.844/\phi_W$
$\phi 2 = -0.473\phi_W$ $\quad\quad \theta_W - \theta_T = 0.669/\phi_W$
$\quad\quad\quad\quad\quad\quad\quad\quad R7 = -0.552/\phi_W$ In the present invention, any focusing method may be employed either by moving the front component forward as the object distance shortens, or by moving the rear component rearward, or by moving the entire lens system forward.

As has been described above, according to the present invention, with the use of the type in which the refractive power of the front component is positive, the refractive power of the rear component is negative, and the air separation between the front and rear components is variable for zooming, it is possible to achieve a zoom lens of reduced size in a simple form of four lenses in total, while still permitting good stability of aberration correction, by a proper power distribution, lens form and choice of glass material.

What is claimed is:

1. A small sized zoom lens consisting of two lens units comprising:
   a first lens unit of positive refractive power including at least one positive lens and at least one negative lens; and
   a single second lens element of negative refractive power arranged on the image side of said first lens unit and consisting of a negative meniscus lens concave toward the front, wherein zooming is performed by varying the axial separation between said first lens unit and said single second lens element.

2. A small sized zoom lens according to claim 1, satisfying the following conditions:
$\nu 4 > 40$
$-0.8/\phi_W < RO < -0.3/\phi_W$
where $\phi_W$ is the refractive power of the entire system in the wide angle end, $\nu 4$ is the Abbe number of said negative meniscus lens, and RO is the radius of curvature of the lens surface at the object side of said negative meniscus lens.

3. A small sized zoom lens comprising a first lens unit of positive refractive power including a positive lens, a negative lens and a positive lens, in this order from the front; and
   a single second lens element of negative refractive power arranged on the image side of said first lens unit and consisting of a negative meniscus lens concave toward the front, wherein zooming is performed by varying the axial separation between said first lens unit and said single second lens element.

4. A small sized zoom lens according to claim 3, satisfying the following conditions:
$\nu 4 > 40$
$-0.8/\phi_W < RO < -0.3/\phi_W$
where $\phi_W$ is the refractive power of the entire system in the wide angle end, $\nu 4$ is the Abbe number of said negative meniscus lens, and RO is the radius of curvature of the lens surface at this object side of said negative meniscus lens.

5. A small sized zoom lens comprising:
   a front component comprising, from front to rear, a first lens of positive refractive power, a second lens of negative refractive power and a third lens of positive refractive power, and having a positive refractive power as a whole; and
   a single rear element arranged on the image side of said front component and consisting of a meniscus-shaped fourth lens of negative refractive power concave toward the front, wherein zooming is performed by varying an axial separation between said front component and said single rear element.

6. A small sized zoom lens according to claim 5, satisfying the following conditions:
$\phi_W < \phi 1 < 1.5\phi_W$
$-\phi_W < \phi 2 < -0.4\phi_W$
$0.4/\phi_W < e_W < 1/\phi_W$
where $\phi 1$ is the refractive power of said front component, $\phi 2$ is the refractive power of said single rear element, $\phi_W$ is the refractive power of the entire system in the wide angle end, and $e_W$ is the interval between the principal points of said front component and said single rear lens element in the wide angle end.

7. A small sized zoom lens according to claim 6, satisfying the following conditions:
$\nu 4 > 40$
$-0.8/\phi_W < R7 < -0.3/\phi_W$
where $\nu 4$ is the Abbe number of the glass of the fourth lens, and R7 is the radius of curvature of the front surface of the fourth lens.

8. A small sized zoom lens according to claim 7, satisfying the following conditions:
$0.2/\phi_W < e_W - e_T < 0.8/\phi_W$
$20 < \nu 1 < 40$
where $e_T$ is the interval between the principal points of said front component and said single rear lens element in the telephoto end, and $\nu 1$ is the Abbe number of the glass of said first lens.

9. A small sized zoom lens comprising a first lens unit of positive refractive power and a single second lens element arranged on an image side of said first lens unit, wherein zooming is performed by varying the axial separation between said first lens unit and said single second lens element, said zoom lens satisfying the following conditions:

$\phi_W < \phi_1 < 1.5\phi_W$
$-\phi_W < \phi_2 < -0.4\phi_W$
$0.4/\phi_W < e_W < 1/\phi_W$ where $\phi_1$ is the refractive power of said first lens unit $\phi_2$ is the refractive power of said single second lens element; $\phi_W$ is the refractive power of the entire system in the wide angle end, and $e_W$ is the interval between the principal points of said first lens unit and said single second lens element.

10. A small sized zoom lens according to claim 9, satisfying the following condition:

$0.2/\phi_W < e_W - e_T < 0.8/\phi_W$ where $e_T$ is the interval between the principal points of said first lens unit and said single second lens element in the telephoto end.

11. A small sized zoom lens comprising:
   first lens means of positive refractive power including at least one positive lens and at least one negative lens; and
   a single second lens element of negative refractive power arranged on the image side of said first lens means and consisting of a negative meniscus lens concave toward the front, wherein said first lens means and said single second lens element are axially moved together and at the same time the axial separation thereof is varied to effect a zooming.

12. A small sized zoom lens according to claim 11, satisfying the following conditions:

$\phi_W < \phi_1 < 1.5\phi_W$
$-\phi_W < \phi_2 < -0.4\phi_W$
$0.4/\phi_W < e_W < 1/\phi_W$ where $\phi_1$ is the refractive power of said first lens means, $\phi_2$ is the refractive power of said single second lens element, $\phi_W$ is the refractive power of the entire system in the wide angle end, and $e_W$ is the interval between the principal points of said first lens means and said second single lens element in the wide angle end.

13. A small sized zoom lens according to claim 11, satisfying the following conditions:

$\nu_4 > 40$
$-0.8/\phi_W < R_7 < -0.3/\phi_W$ where $\nu_4$ is the Abbe number of the glass of the negative meniscus lens, and $R_7$ is the radius of curvature of the front surface of the negative meniscus lens.

14. A small sized zoom lens according to claim 11, wherein said first lens means and said single second lens element move toward the object side as they move from the wide angle end to a telephoto end in their zooming range.

* * * * *